(12) United States Patent
Agrawal et al.

(10) Patent No.: US 7,327,744 B2
(45) Date of Patent: Feb. 5, 2008

(54) FIBRE CHANNEL FORWARDING INFORMATION BASE

(75) Inventors: Pawan Agrawal, San Jose, CA (US); Sujatha Sundararaman, Milpitas, CA (US); Raymond J. Kloth, Saratoga, CA (US); Deepak Goel, Vignana Nagar (IN); Nitin Garg, San Jose, CA (US); Sachin Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 11/035,158

(22) Filed: Jan. 12, 2005

(65) Prior Publication Data

US 2006/0153187 A1 Jul. 13, 2006

(51) Int. Cl.
*H04L 12/28* (2006.01)
(52) U.S. Cl. ............... 370/401; 370/392; 370/389
(58) Field of Classification Search ................ None
See application file for complete search history.

(56) References Cited

U.S. PATENT DOCUMENTS

| | | | | |
|---|---|---|---|---|
| 6,118,776 A * | 9/2000 | Berman | ................. | 370/351 |
| 6,185,203 B1 | 2/2001 | Berman | | |
| 2005/0169188 A1* | 8/2005 | Cometto et al. | ............. | 370/249 |
| 2005/0232269 A1* | 10/2005 | Yao et al. | .................... | 370/389 |
| 2005/0286551 A1* | 12/2005 | Berman | ....................... | 370/465 |
| 2006/0034302 A1* | 2/2006 | Peterson | ..................... | 370/401 |

OTHER PUBLICATIONS

DeSanti, C., et al., "Fibre-Channel Domain Management MIB", draft-desanti-fc-domain-manager-00.txt, Cisco Systems, Jan. 23, 2004, pp. 1-34.
PCT Search report from Application No. PCT/US06/01380, Issued Apr. 9, 2007.
PCT Written Opinion from Application No. PCT/US06/01380, Issued Apr. 9, 2007.

* cited by examiner

*Primary Examiner*—Duc Ho
(74) *Attorney, Agent, or Firm*—Beyer Weaver LLP (57) ABSTRACT

According to the present invention, methods and apparatus are provided to improve the techniques and mechanisms for forwarding packets at a fiber channel switch. A combined area table/domain table (ATDT) is accessed using destination information associated with a fiber channel packet. Area/port or domain information can be used to address entries in the ATDT. Each entry provides one or more paths to a given destination. Traffic shaping, load balancing, and other policy based forwarding considerations can be applied.

28 Claims, 6 Drawing Sheets

| | Path 311 | Path 313 | Path 315 | | ... | | | Path 319 |
|---|---|---|---|---|---|---|---|---|
| Domain 321 | 0 | 0 | 0 | | | | | 0 |
| Domain 323 | 0 | 0 | 0 | | | | | 0 |
| ... | | | | | | | | |
| Domain 329 | 0 | 0 | 0 | | | | | 0 |
| Area 331 | 0 | 0 | 0 | | | | | 0 |
| Area 333 | 0 | 1 | 0 | | | | | 0 |
| ... | | | | | | | | |
| Area 339 | 0 | 0 | 1 | | | | | 0 |
| Domain 341 | 0 | 0 | 0 | | | | | 0 |
| Domain 343 | 0 | 0 | 0 | | | | | 0 |
| ... | | | | | | | | |
| Domain 349 | 0 | 1 | 0 | | | | | 1 |
| Domain 351 | 0 | 0 | 0 | | | | | 0 |
| Domain 353 | 0 | 0 | 1 | | | | | 0 |
| ... | | | | | | | | |
| Domain 359 | 1 | 0 | 0 | | | | | 0 |

Virtual Storage Area Network 381 { Domain 321 ... Area 339 }
Virtual Storage Area Network 383 { Domain 341 ... Domain 349 }
Virtual Storage Area Network 385 { Domain 351 ... Domain 359 }

Fibre Channel Destination Index 401

| Domain Address 421 | Area Address 423 | Port Address 425 |

FIBRE CHANNEL FORWARDING INFORMATION BASE

BACKGROUND OF THE INVENTION

1. Field of the Invention

The present invention generally relates to fibre channel fabrics. More specifically, the present invention provides techniques and mechanisms for forwarding packets received at fibre channel switches.

2. Description of Related Art

When a fibre channel packet is received at a fibre channel switch, the fibre channel switch extracts destination information from the packet to determine how to forward the packet. In many instances, the destination information is a Fibre Channel Destination Index (FC D_ID) that is extracted. The switch uses the destination information to access a forwarding information base.

In some examples, the forwarding information base indicates possible paths to the destination. The path can be associated with a connection to a central processing unit (CPU), another fibre channel switch, a host, or a local disk array. Load balancing, traffic shaping, and policy based forwarding can also be applied to further select one of multiple paths.

However, conventional mechanisms for determining the appropriate forwarding paths are either expensive, inefficient, and/or inflexible. Expensive hardware components are used and in many instances, lookups to multiple tables are required for a single forwarding determination.

Consequently, it is desirable to provide techniques for improving packet forwarding at a fibre channel switch to allow more effective and efficient transmission of fibre channel packets.

SUMMARY OF THE INVENTION

According to the present invention, methods and apparatus are provided to improve the techniques and mechanisms for forwarding packets at a fibre channel switch. A combined area table/domain table (ATDT) is accessed using destination information associated with a fibre channel packet. Area/port or domain information can be used to address entries in the ATDT. Each entry provides one or more paths to a given destination. Traffic shaping, load balancing, and other policy based forwarding considerations can be applied.

In one embodiment, a method for efficiently forwarding a fibre channel packet at a fibre channel switch is provided. A fibre channel packet is received. The fibre channel packet includes a domain address and an area address. An entry in a combined area table domain table is referenced to determine one or more possible output paths. The fibre channel packet is forwarded along the selected output path.

In another embodiment, a fibre channel switch for efficiently forwarding a fibre channel packet is provided. The fibre channel switch includes an input interface, a processor, and an output interface. The input interface is configured to receive a fibre channel packet. The fibre channel packet includes a domain address and an area address. The processor is configured to reference an entry using the domain address to determine one or more possible output paths. An output interface is configured to forward the fibre channel packet along the selected output path.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

When a fibre channel packet reaches a fibre channel switch, destination information from the packet is extracted to determine how to forward the packet. For example, when a fibre channel packet enters a switch, the path through which the packet should be forwarded is determined by extracting the fibre channel destination index. For example, the domain part of the fibre channel destination index indicates the destination switch for the fibre channel packet. The fibre channel switch is typically coupled to a variety of devices such as other switches, hosts, disks, and tape devices through different paths.

Any connection between two fibre channel devices where FC packets can flow is referred to herein as a path. A path can be remote or local to a switch. If the final destination of the packet is connected locally to the switch port, the path is local otherwise, the path is remote. For example, a link between two switches is a remote path. A bundle of links between two switches is also a remote path. A link to a locally connected disk or CPU is an example of a local path.

In one example, the path is a link between a fibre channel switch and another fibre channel switch. In another example, the path is a group of bundled links to another fibre channel switch. In yet another example, the path is a connection to a local central processing unit (CPU).

According to various embodiments, when a fibre channel switch receives a packet, it determines that the packet should be forwarded along a particular path by accessing a database and performing software processing to determine an appropriate entry in the database. The database may include thousands of destinations, each associated with one or more forwarding paths. Any database at a fibre channel switch used to determine paths for reaching destinations is referred to herein as a forwarding information base.

For load balancing and policy based forwarding, switches may often have to hold many alternative paths to a particular destination. Any mechanisms for forwarding packets based on a particular set of network administrator established rules is referred to herein as policy based forwarding. Policy based forwarding (PBF) provides a mechanism for expressing and implementing forwarding/routing of data packets based on the policies defined by the network administrators. In some examples, policy based forwarding may entail forwarding certain priority packets along high bandwidth paths or providing a certain set of nodes with certain channels with particular bandwidth minimums.

Software processing is typically far too slow and inefficient for anything but the simplest of applications. Consequently, hardware mechanisms are typically used to determine the forwarding path. However, even some hardware mechanisms do not give adequate performance. A fibre channel switch should be able to perform lookups for forwarding paths as packets are received at line rate. Ever increasing lookup efficiency is required with increasing line rates. One hardware approach that does provide sufficient performance involves the use of a ternary content addressable memory (TCAM).

Ternary content addressable memory used with synchronous static random access memory (SSRAM) provides high lookup speeds with predictable access times. Ternary content addressable memory allows very wide data searches, but suffers from several drawbacks including high cost, high power consumption and complex update mechanisms. Large TCAM's are typically separate components and consequently can not be implemented on a single switch on a chip system. Small TCAM's included in an ASIC typically lack scalability.

Consequently, the techniques of the present invention provide a more efficient hardware mechanism for accessing forwarding path information. According to various embodiments, a single area table domain table (ATDT) is addressed by either the area/port or domain part of the FC D_ID. The table maintains forwarding path information for all paths associated with the fibre channel switch. Realizing that for an FC packet, the path is either to a local device (connected directly to this switch) or to a remote device (connected to a different switch)—but to both, the same entry in an ATDT can represent either a local path or a remote path. The E-port register maintains a list of possible the possible remote paths (ISL) from this switch.

In one example, each entry in the ATDT is a bit map of all the paths associated with a switch. One or more paths to a given destination is represented by setting multiple bits in an ATDT entry. Load balancing and policy based forwarding can be applied in the selection of a path. When a path is selected, it is mapped to a destination port and the packet is forwarded to the port. A mask register can be used to differentiate between ports that have locally attached devices and the E-ports.

Ports used to connect switches to each other in a fibre channel network are referred to herein as E-ports. Ports used to connect a switch to a host or a disk are referred to herein as fabric-ports (F-ports). In one example, E-ports are used to connect switches while F-ports are used to connect a switch to a host or to a disk. Similarly, fabric loop-ports (FL-ports) can be used to connect a switch to multiple storage devices. Ports such as F-ports and FL-ports are herein referred to as edge ports. Other ports such as E-ports are referred to as non-edge ports. For local devices, typically only one bit is set in the ATDT, although more than one bit can be set.

An ATDT provides a very inexpensive, cost-effective solution that allows the implementation of a forwarding information base (FIB) with load balancing and policy-based features using a single lookup in a single table. The ATDT is fully configurable as any FC D_ID can be mapped to any path. The solution is also fully scalable to any number of ports in a switch. In one example, use of an ATDT instead of a mechanism such as a TCAM allows more efficient implementation of a switch on a chip system.

Figure 1:
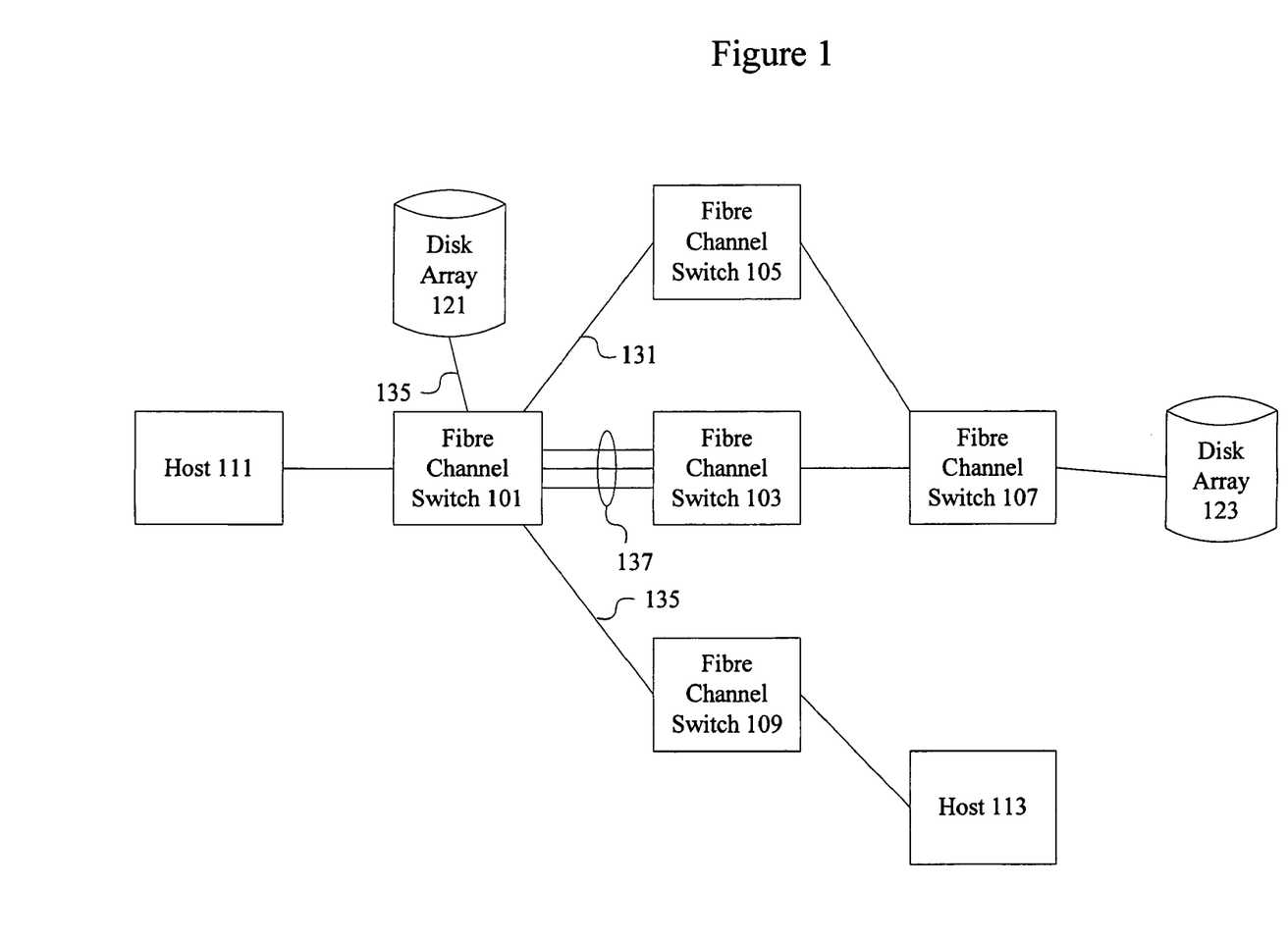
FIG. 1 is a diagrammatic representation showing a fibre channel network that can use the techniques of the present invention.

FIG. 1 is a diagrammatic representation of the fibre channel network that can use the techniques of the present invention. The fibre channel network includes fibre channel switches 101, 103, 105, 107, and 109. Fibre channel switch 101 is coupled to a disk array 121 through path 135. The fibre channel switch 101 is also coupled to a host 111. The fibre channel switch 101 is coupled to fibre channel switch 103, 105, and 109 through paths 137, 131, and 135 respectively. Disk array 123 is coupled to fibre channel switch 107 and host 113 is coupled to fibre channel switch 109. Fibre channel switch 101 may also have a path to a local CPU. Path 137 includes multiple ports bundled for redundancy and bandwidth purposes.

In one example, when a fibre channel switch 101 receives a packet from host 111, the fibre channel switch 101 determines how to forward the packet. In this example, the packet may have a destination associated with fibre channel switch 107. The fibre channel switch 101 accesses the forwarding information base (FIB) to determine that the packet can be forwarded along path 131 or path 137. Various load balancing and policy considerations can be used to determine which one of the two paths to use. In another example, the destination of the packet may indicate that be fibre channel switch 101 should forward the packet along path 135. In any case, the fibre channel switch 101 should be able to make its forwarding decision at a rate that allows maximum throughput.

Figure 2:
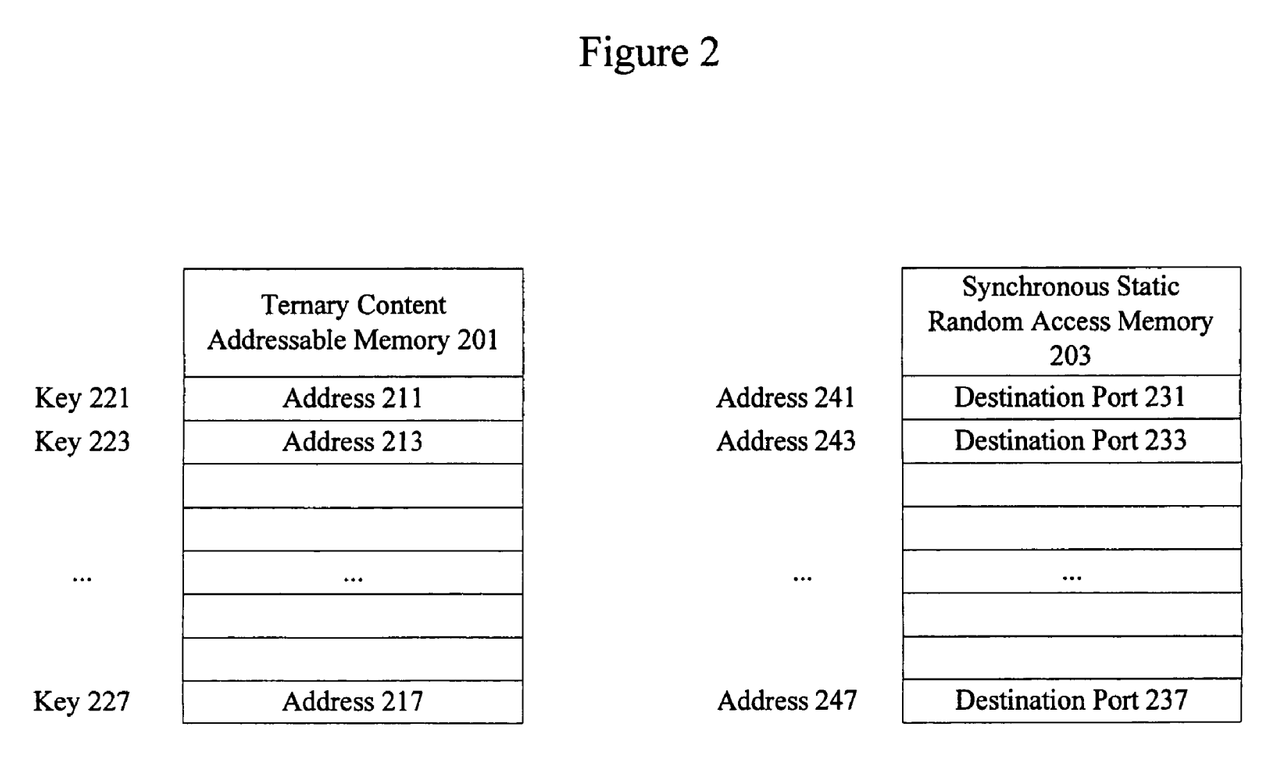
FIG. 2 is a diagrammatic representation depicting TCAM and SSRAM lookup scheme.

FIG. 2 is a diagrammatic representation showing conventional hardware mechanism used to determine forwarding paths. A TCAM 201 is typically used with an SSRAM 203. Keys A, B, and C are used to access entries in TCAM 201 to determine addresses 221, 223, and 227. In many instances, multiple lookups are required to provide a robust feature set at a fibre channel fabric switch. Using the addresses 221, 223, and 227 and/or associated address 221, 223, and 227 of SRAM, destination ports 231, 233 and 237 are determined. Although TCAMs provide efficient access of destination paths and destination ports, TCAMs are expensive components. Furthermore, multiple lookups to multiple tables are required. Consequently, the techniques of the present invention provide more effective mechanisms for determining forwarding paths.

Figure 3:
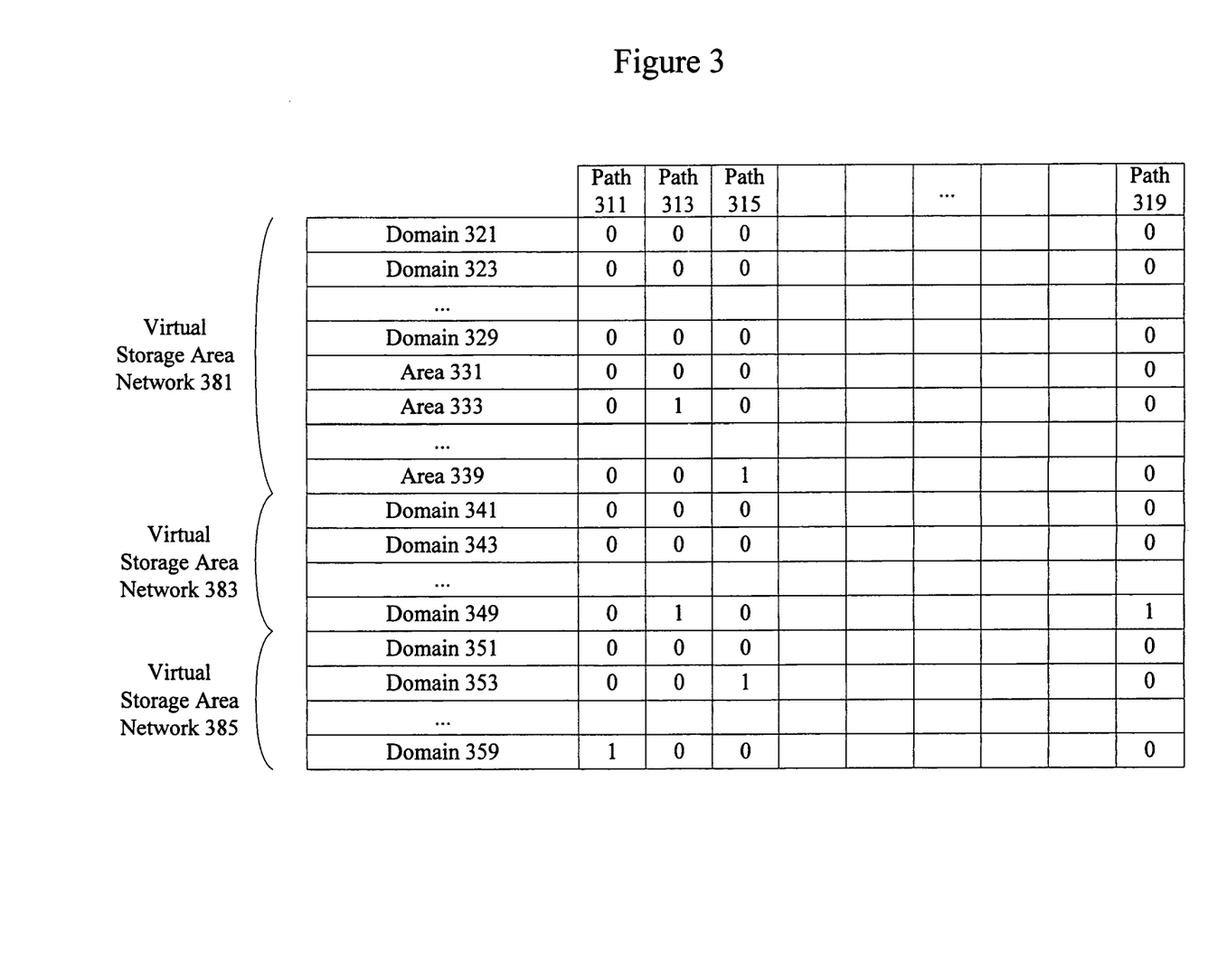
FIG. 3 is a diagrammatic representation showing a combined area table domain table.

FIG. 3 is a diagrammatic representation showing one example of a combined area table domain table. The techniques of the present invention allow the use of a single table for both area and domain searches. Any mechanism used to hold information to determine forwarding paths to both local and remote destinations in a fibre channel network is referred to herein as an ATDT. In some examples, an ATDT includes information for multiple virtual storage area networks 381, 383, and 385 in a single table format. In conventional applications, multiple lookups to multiple tables would be required. It should be noted, however, that in some examples, the ATDT is not combined. In some examples, the ATDT may be implemented as separate tables including an area table and a domain table.

According to various embodiments, columns represent paths 311, 313, 315, and 319. Paths can be local or remote. For example, each path can be a connection from a fabric switch to another device, such as a CPU, a local device, or another switch. Rows can be used to represent domain and/or area. It should be noted that other representations are also possible. According to various embodiments, entries can change on the fly. New rows and columns can come alive and/or change dynamically. A wide variety of data structures can be used to implement an ATDT as will be appreciated by one of skill in the art. To determine possible forwarding paths for a packet, the virtual storage area network associated with the packet is determined. As will be appreciated, virtual storage area networks allow arrangement of storage resources based on user requirements and needs instead of arrangement based on physical convenience.

When a virtual storage area network is determined, the domain portion of an FC D_ID is extracted and used to access the domain entries 321, 323, and 329, or 331, 333, and 339, or 343 and 349, or 351, 353, and 359 of an ATDT. If the destination is remote, the area is not used. However, if it is determined that the incoming frame belongs to the local domain, the ATDT is accessed to determined the appropriate area entry. In some examples, the domain selected is a remote domain 349. To reach remote domain 349, forwarding paths 313 and 319 can be used. According to various embodiments, local destinations are accessed using area entries 331, 333, and 339 and have a single forwarding path.

The ATDT can be implemented in memory associated with an application specific integrated circuit (ASIC). The ATDT allows access and quick identification of one or more paths to a particular destination. The ATDT supports both local destinations as well as remote destinations in a single table. Entries can be accessed using either remote addresses or local addresses. In one example, some entries can be accessed using area addresses while others are accessed using domain addresses. The ATDT also can accommodate destinations associated with multiple virtual storage area networks (VSANs).

Figure 4:
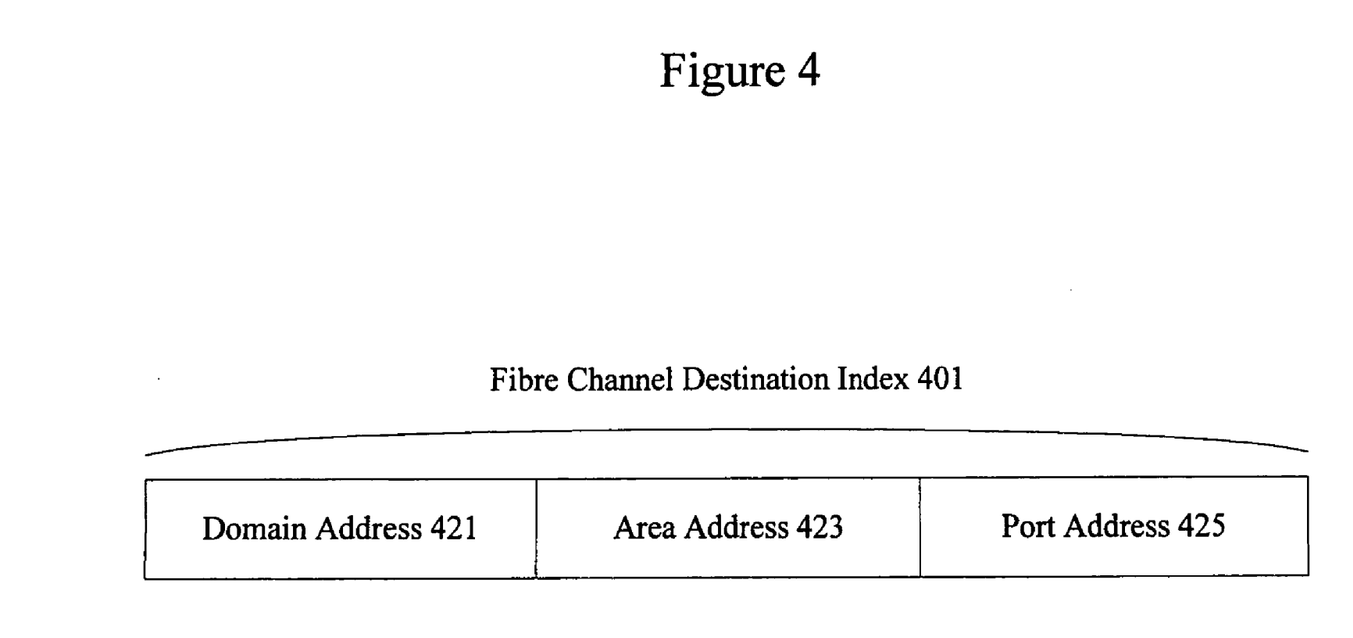
FIG. 4 is a diagrammatic representation showing a Fibre Channel Destination Index.

FIG. 4 is a diagrammatic representation of a fibre channel destination index. The fibre channel destination index 401 includes a domain address 421, an area address 423, and a port address 425. According to various embodiments, each address is 8-bits in length allowing up to 256 domains per VSAN and up to 256 areas per domain.

According to various embodiments, each domain address is associated with a switch while each area address is associated with a destination within that switch. A port address is associated with a particular device in a chain of devices. For example, the domain address can identify a particular fibre channel switch. The area address identifies the port the device is connected to in the particular fibre channel switch. The port address identifies a particular disk associated with the disk array.

Figure 5:
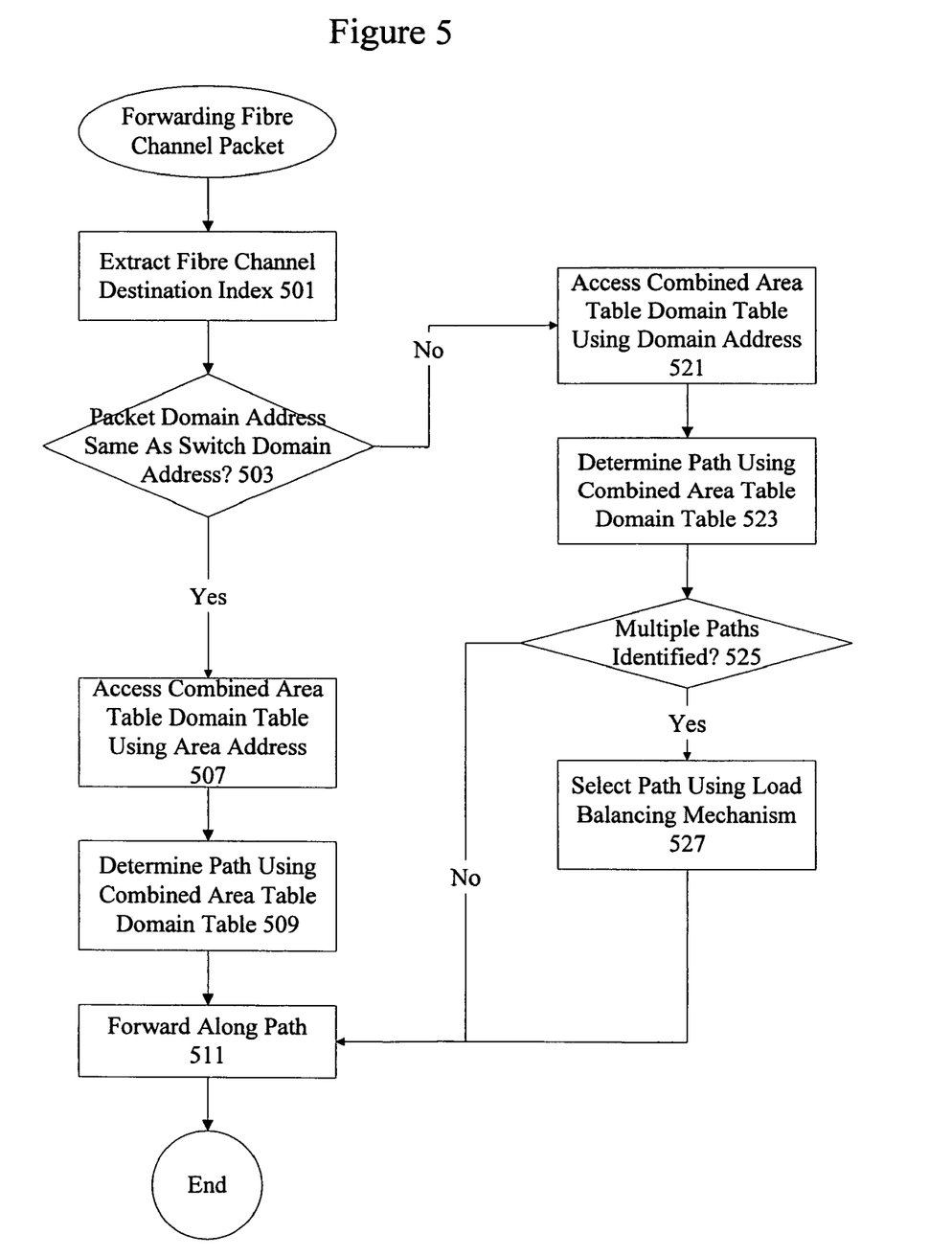
FIG. 5 is a flow process diagram showing one technique for forwarding a packet.

FIG. 5 is a flow process diagram showing forwarding of a fiber channel packet. At 501, a fibre channel destination index is extracted. The virtual storage area network associated with the fiber channel packet can also be determined. At 503, it is determined if the packet domain address is the same as the switch domain address. If the domain part of the packet (FC D_ID) matches the switch's domain address at 503, the combined area table domain table is accessed using the area address (or optionally the port address) at 507. That is, the packet has reached the appropriate domain and now the area address should be used to identify a particular local device. According to various embodiments, when an ATDT is read, it is now known whether the area or domain portion should be used. According to various embodiments, the E-port register is used after every access of ATDT. The E-port register includes a bit map of all the E-ports. The E-port register is used to extract all the remote paths or all the local paths. The register separates the combined local and remote ports into either local or remote.

If the destination of the packet is a local device, the area address is used to access the table. At 509, the path to the local device is determined based on the area address in the combined area table domain table. The packet is forwarded along the path at 511. If the packet domain address is not the same as the switch domain address at 503, the combined area table domain table is accessed using the domain address at 521. The path is determined using the domain address in the combined area table domain table at 523. At 525, it is determined if multiple paths have been identified. If multiple paths have been identified, a path is selected using a mechanism such as load balancing or policy based forwarding. According to various embodiments, the multiple paths identified in the combined ATDT can be forwarded to a scheduler, traffic shaper, or a load balancer. In one simple mechanism, packets with multiple forwarding paths have forwarding paths randomly selected.

In another example, forwarding paths can be assigned based on weighted priorities. If only a single path is identified at 525, the packet is forwarded along with the identified path at 511.

The forwarding mechanisms of the present invention can be implemented on a variety of devices. In one example, the mechanisms can be implemented on an MDS 9000 series fibre channel device available from Cisco System of San Jose, Calif. According to various embodiments, forwarding and switching functionality can be implemented on a single Application Specific Integrated Circuit (ASIC). In another example, the techniques of the present invention can be implemented on a programmable device such as a Field Programmable Gate Array (FPGA). It should be noted that a wide variety of switch and router configurations are available.

Figure 6:
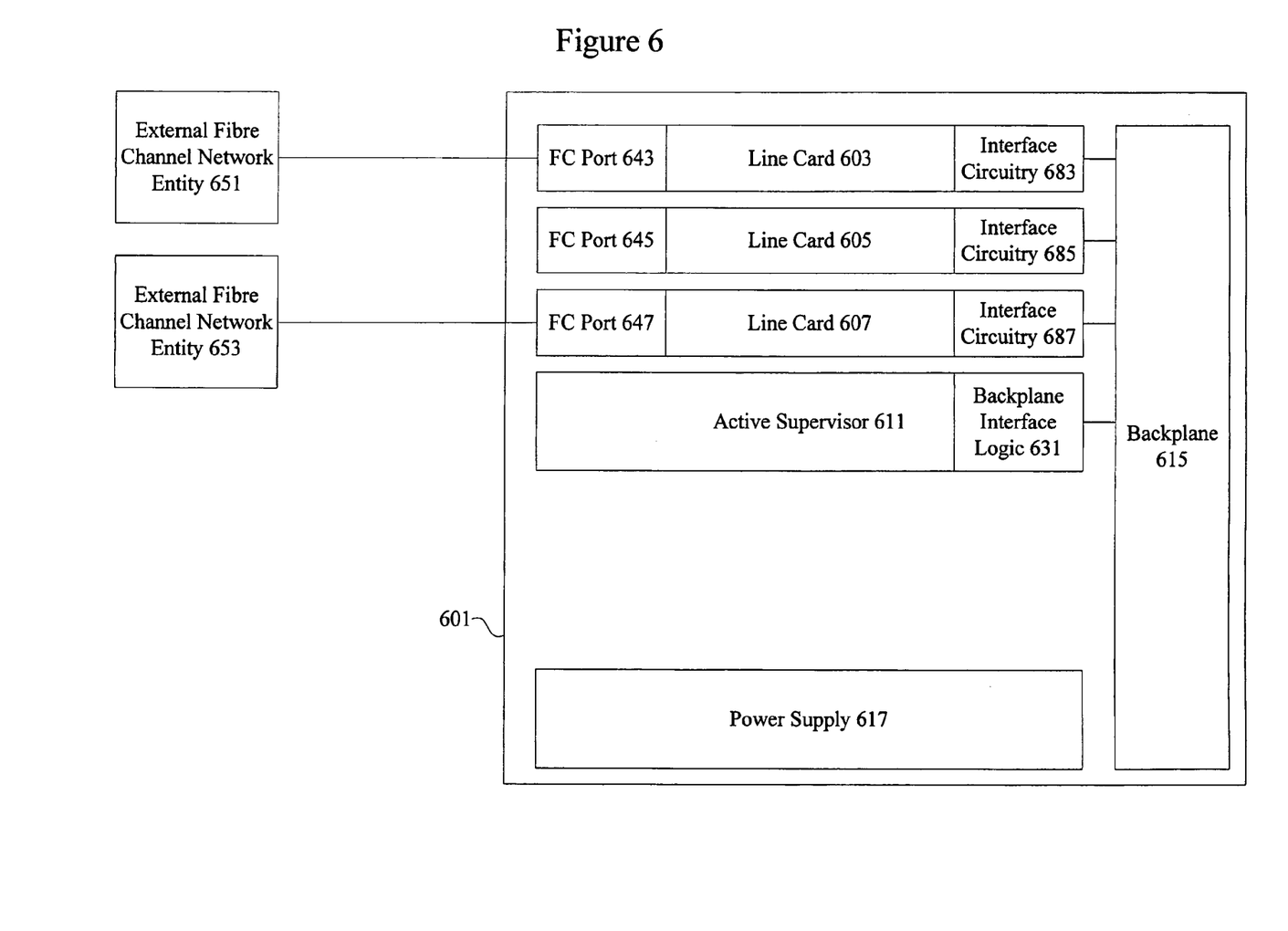
FIG. 6 is a diagrammatic representation showing one example of a fibre channel switch.

FIG. 6 is a diagrammatic representation of one example of a fibre channel switch that can be used to implement techniques of the present invention. Although one particular configuration will be described, it should be noted that a wide variety of switch and router configurations are available. The tunneling switch 601 may include one or more supervisors 611. According to various embodiments, the supervisor 611 has its own processor, memory, and storage resources.

Line cards 603, 605, and 607 can communicate with an active supervisor 611 through interface circuitry 683, 685, and 687 and the backplane 615. According to various embodiments, each line card includes a plurality of ports that can act as either input ports or output ports for communication with external fibre channel network entities 651 and 653. The backplane 615 can provide a communications channel for all traffic between line cards and supervisors. Individual line cards 603 and 607 can also be coupled to external fibre channel network entities 651 and 653 through fibre channel ports 643 and 647.

Line cards 675 and 677 can communicate with an active supervisor 611 through interface circuitry 695 and 697. Line cards 675 and 677 also include Internet Protocol (IP) ports for communication with external IP network entities including IP network entity 655.

External fibre channel network entities 651 and 653 can be nodes such as other fibre channel switches, disks, RAIDS, tape libraries, or servers. It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method for efficiently forwarding a fibre channel packet at a fibre channel switch, the method comprising:
   receiving a fibre channel packet, the fibre channel packet including a domain address and an area address;
   referencing an entry in a combined area table domain table to determine one or more possible output paths;
   forwarding the fibre channel packet along a selected output path.

2. The method of claim 1, wherein the combined area table domain table is referenced with the domain address when the domain address associated with the fibre channel packet is not the domain of the fibre channel switch.

3. The method of claim 2, wherein the selected output path is a path to a neighboring fibre channel switch.

4. The method of claim 2, wherein the selected output path comprises a plurality of ports.

5. The method of claim 1, wherein the combined area table domain table is referenced with the area address when the domain address associated with the fibre channel packet is the domain of the fibre channel switch.

6. The method of claim 5, wherein the selected output path is a path to a central processing unit (CPU).

7. The method of claim 1, further comprising selecting an output path using load balancing.

8. The method of claim 1, wherein the combined area table domain table has domain addresses and area addresses per virtual storage area network delineating rows and paths delineating columns.

9. The method of claim 8, wherein the combined area table domain table has a plurality of bit entries.

10. The method of claim 8, wherein the combined area table domain table is included in an integrated circuit device.

11. A fibre channel switch for efficiently forwarding a fibre channel packet, fibre channel switch comprising:
    an input interface configured to receive a fibre channel packet, the fibre channel packet including a domain address and an area address;
    a processor configured to reference an entry using the domain address to determine one or more possible output paths;
    an output interface configured to forward the fibre channel packet along a selected output path.

12. The fibre channel switch of claim 11, wherein the entry is referenced using the domain address when the domain address associated with the fibre channel packet is not the domain of the fibre channel switch.

13. The fibre channel switch of claim 12, wherein the selected output path is a path to a neighboring fibre channel switch.

14. The fibre channel switch of claim 12, wherein the selected output path comprises a plurality of ports.

15. The fibre channel switch of claim 11, wherein the entry is referenced using the domain address and the area address when the domain address associated with the fibre channel packet is the domain of the fibre channel switch.

16. The fibre channel switch of claim 15, wherein the selected output path is a path to a central processing unit (CPU).

17. The fibre channel switch of claim 11, further comprising selecting an output path using load balancing.

18. The fibre channel switch of claim 11, wherein a combined area table domain table has domain addresses and area addresses per virtual storage area network delineating rows and paths delineating columns.

19. The fibre channel switch of claim 18, wherein the combined area table domain table has a plurality of bit entries.

20. The fibre channel switch of claim 18, wherein the combined area table domain table is included in an integrated circuit device.

21. A system for efficiently forwarding a fibre channel packet, the system comprising:
    means for receiving a fibre channel packet, the fibre channel packet including a domain address and an area address;
    means for referencing an entry in a combined area table domain table to determine one or more possible output paths;
    means for forwarding the fibre channel packet along a selected output path.

22. The system of claim 21, wherein the combined area table domain table is referenced with the domain address when the domain address associated with the fibre channel packet is not the domain of the fibre channel switch.

23. The system of claim 22, wherein the selected output path is a path to a neighboring fibre channel switch.

24. The system of claim 22, wherein the selected output path comprises a plurality of ports.

25. The system of claim 21, wherein the combined area table domain table is referenced with the area address when the domain address associated with the fibre channel packet is the domain of the fibre channel switch.

26. The system of claim 25, wherein the selected output path is a path to a central processing unit (CPU).

27. The system of claim 21, further comprising selecting an output path using load balancing.

28. The system of claim 21, wherein the combined area table domain table has domain addresses and area addresses per virtual storage area network delineating rows and paths delineating columns.

* * * * *